Apr. 10, 1923.
J. H. MILLSAPS
1,451,079
LUMBER SAWING IMPLEMENT
Filed June 16, 1921
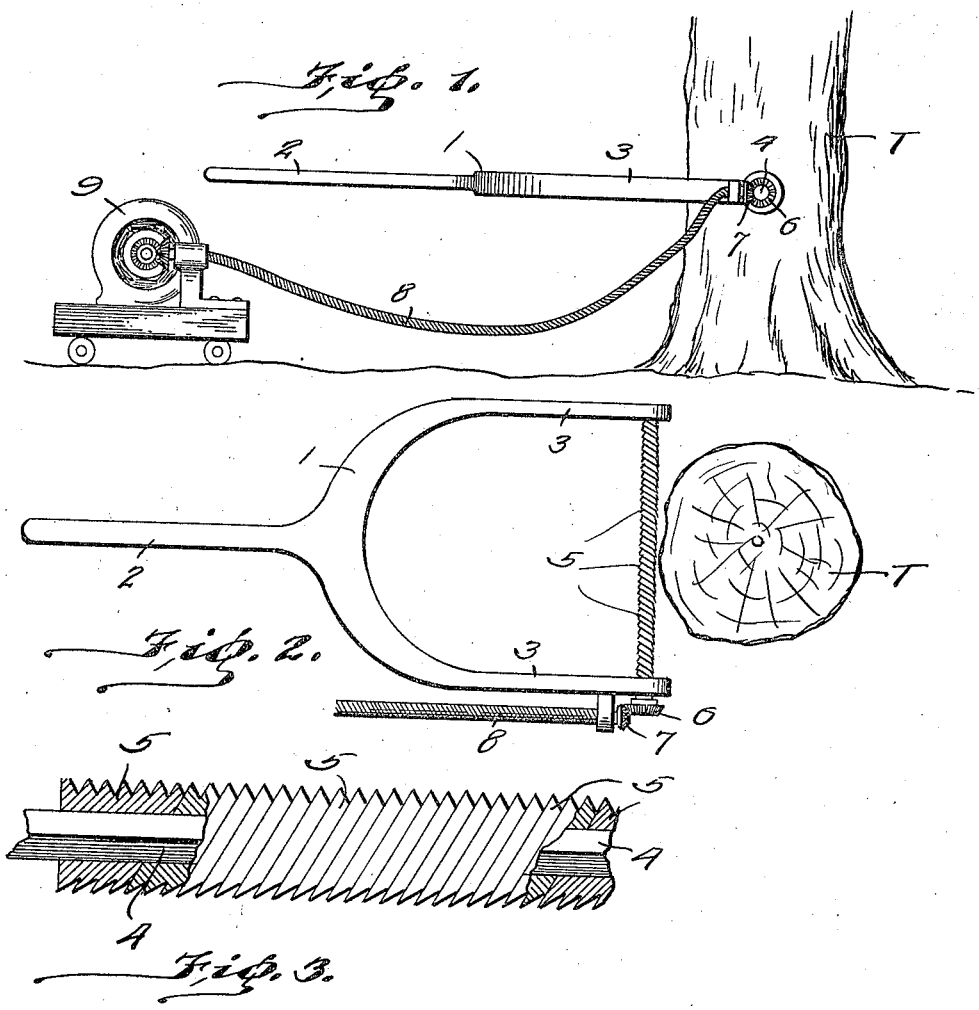
Inventor
J.H.Millsaps
By
Attorney Patented Apr. 10, 1923.

1,451,079

UNITED STATES PATENT OFFICE.

JEFFERSON H. MILLSAPS, OF CHICAGO, ILLINOIS.

LUMBER-SAWING IMPLEMENT.

Application filed June 16, 1921. Serial No. 477,960.

*To all whom it may concern:*

Be it known that I, JEFFERSON H. MILLSAPS, a citizen of the United States, residing at Chicago, in the county of Cook and State of Illinois, have invented a new and useful Lumber-Sawing Implement, of which the following is a specification.

The object of my invention is to provide a novel and efficient implement for felling trees which can be operated from a suitable source of power by one man. It is further my object to provide a novel means for adjusting an implement of this type. I attain these and other objects of my invention by the mechanism illustrated in the accompanying drawings, in which—

Figure 1 is a side elevation of my device in use;

Fig. 2 is a top plan of same on a slightly enlarged scale;

Fig. 3 is a detail view partly in section of the rotating saw 5.

Like numerals indicate like parts in each of the several views.

Referring to the accompanying drawings I provide a novel Y-shaped or wishbone shaped holder 1 between the ends of arm 3 on which is mounted a suitable rotatable sawing member 5 which on one end carries a gear 6 as shown in Fig. 2. The member 1 is provided with a suitable handle 2. I provide a second gear 7 meshing with gear 6, the gear 7 being mounted on a flexible shaft 8 by which the rotatable sawing member 5 is driven from a suitable source of power 9. The sawing implement 5 which is preferably made in several sections as shown in Fig. 3, has the abutting ends of said sections beveled as illustrated, these sections being mounted on a suitable core or angular shaft 4, on the extended end of which is mounted the gear 6. It is within the contemplation of my invention to mount the mandrel 5 in a holder having adjustable arms pivotally mounted after the manner illustrated in Fig. 4 for the other form of my invention.

The operation of my invention will be apparent from the accompanying drawings. The holder 1 is placed against the tree at the point to be sawed and power is applied to rotate the mandrel 5 by reason of its operative connection with the flexible shaft 8 which is driven from a suitable source of power 9. The important advantage of this device is that the device can be operated very close to or even below the ground by digging around the roots of a tree, such a manner of sawing being impractical if any of the usual types of cross cut saws were employed, besides providing an implement that can be operated more easily and more efficiently.

What I claim is—

1. In a sawing implement of the class described, a wishbone-shaped holder, a shaft rotatably mounted on the holder, a mandrel mounted on said shaft, said mandrel being formed of removable sections having slanting abutting end faces, a flexible driving shaft operatively connected with the rotatable shaft, and power means for driving said rotatable shaft.

2. As a new article of manufacture, for a sawing implement of the class described, the combination of a holder, an angular shaft rotatably mounted in the holder, and a plurality of sections having a circumferential continuous spiral edge, each of said sections having their abutting end faces inclined, said sections being independently removable whereby the sections will perform as if the sawing element comprised one long cutter.

JEFFERSON H. MILLSAPS.